United States Patent
Ku et al.

(10) Patent No.: US 12,489,601 B2
(45) Date of Patent: Dec. 2, 2025

(54) SYSTEM AND METHOD FOR EXECUTING MACHINE LEARNING MODEL INFERENCE

(71) Applicants: Inventec (Pudong) Technology Corporation, Shanghai (CN); INVENTEC CORPORATION, Taipei (TW)

(72) Inventors: Yu Te Ku, Taipei (TW); Chih-Fan Hsu, Taipei (TW); Wei-Chao Chen, Taipei (TW); Feng-Hao Liu, Taipei (TW); Shih-Hao Hung, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 31 days.

(21) Appl. No.: 18/735,142

(22) Filed: Jun. 5, 2024

(65) Prior Publication Data

US 2025/0293853 A1  Sep. 18, 2025

(30) Foreign Application Priority Data

Mar. 14, 2024 (CN) .......................... 202410295377.8

(51) Int. Cl.
*H04L 9/00* (2022.01)
*H04L 9/08* (2006.01)
*H04L 9/32* (2006.01)

(52) U.S. Cl.
CPC ............ *H04L 9/006* (2013.01); *H04L 9/0869* (2013.01); *H04L 9/3242* (2013.01)

(58) Field of Classification Search
CPC ...... H04L 9/006; H04L 9/0869; H04L 9/3242
USPC ......................................................... 713/155
See application file for complete search history.

(56) References Cited

U.S. PATENT DOCUMENTS

| | | | |
|---|---|---|---|
| 10,193,694 B1 * | 1/2019 | Guditz .................... | H04L 9/006 |
| 11,423,171 B2 * | 8/2022 | Booth, Jr. ............... | G06F 21/44 |
| 2005/0033957 A1 * | 2/2005 | Enokida .................. | H04L 63/12 |
| | | | 726/4 |
| 2005/0268103 A1 * | 12/2005 | Camenisch ........... | H04L 9/3234 |
| | | | 713/176 |
| 2006/0036851 A1 * | 2/2006 | DeTreville .............. | G06F 21/57 |
| | | | 713/159 |
| 2006/0095505 A1 * | 5/2006 | Zimmer ................ | G06F 21/575 |
| | | | 709/203 |

(Continued)

*Primary Examiner* — Thanh T Le
(74) *Attorney, Agent, or Firm* — CKC & Partners Co., LLC (57) ABSTRACT

The present disclosure provides a system including first to second electronic devices. The first electronic device includes a first processor configured to encrypt a machine learning model to generate an encrypted machine learning model. The second electronic device includes a second processor configured to receive the encrypted machine learning model; and a trusted processing circuit configured to decrypt the encrypted machine learning model to get the machine learning model. The third electronic device includes a database configured to store public keys; and a third processor configured to perform a check operation to check whether a first public key of the trusted processing circuit is in the public keys to determine whether the trusted processing circuit is valid. The first processor is further configured to transmit the encrypted machine learning model to the second processor according to the trusted processing circuit determined valid.

10 Claims, 4 Drawing Sheets

(56) References Cited

U.S. PATENT DOCUMENTS

| | | | |
|---|---|---|---|
| 2010/0023760 A1* | 1/2010 | Lee .................... | G06F 21/10 |
| | | | 713/168 |
| 2010/0031029 A1* | 2/2010 | Ilyadis ................ | H04W 12/069 |
| | | | 713/156 |
| 2020/0145419 A1* | 5/2020 | Yitbarek ............. | H04L 63/0853 |
| 2021/0125051 A1* | 4/2021 | Linton .................... | G06N 3/08 |
| 2021/0326459 A1* | 10/2021 | Chivukula ............ | H04L 9/3268 |
| 2022/0124078 A1* | 4/2022 | Erickson ............... | H04L 9/0894 |
| 2024/0062102 A1* | 2/2024 | Lal .......................... | H04L 9/008 |
| 2024/0275782 A1* | 8/2024 | Cuddeford .......... | H04L 63/0823 |
| 2024/0283780 A1* | 8/2024 | Vuppala ............. | H04L 9/3247 |
| 2024/0427872 A1* | 12/2024 | Howes ................. | H04L 9/3268 |
| 2025/0070961 A1* | 2/2025 | Rennich ............... | H04L 9/0825 |
| 2025/0070988 A1* | 2/2025 | Sun ....................... | H04L 63/062 |

\* cited by examiner

SYSTEM AND METHOD FOR EXECUTING MACHINE LEARNING MODEL INFERENCE

CROSS-REFERENCE TO RELATED APPLICATION

This application claims priority to China Application Serial Number CN202410295377.8 filed Mar. 14, 2024, which is herein incorporated by reference.

BACKGROUND

Field of Invention

The present disclosure relates to a system and a method for executing machine learning model inference, and more particularly, a system and a method for machine learning model inference based on identification scheme.

Description of Related Art

With the training cost of machine learning model increasing, protection of sensitive data has become an import issue for sales and deployments of machine learning products. When a model provider sells of provides a machine learning model to a model user, the model provider has to provide only the permission for using the model and make sure that secret data of the model cannot be retrieved, including the structure and weights of the model. In addition, the data for companies to execute machine learning model training or inference is also sensitive. It is necessary to avoid secrets of the data being leaked during usage of the model. The technologies of providing model to the user with secrets secured are secure computing or confidential computing.

SUMMARY

In some embodiments, a system for executing machine learning model inference is provided. The system includes: first to second electronic devices. The first electronic device includes a first processor configured to encrypt a machine learning model to generate an encrypted machine learning model. The second electronic device includes a second processor configured to receive the encrypted machine learning model; and a trusted processing circuit configured to decrypt the encrypted machine learning model to get the machine learning model, and perform a secure computing operation of an inference of the machine learning model. The third electronic device includes a database configured to store a plurality of public keys; and a third processor configured to perform a check operation to check whether a first public key of the trusted processing circuit is in the plurality of public keys of the database to determine whether the trusted processing circuit is valid. The first processor is further configured to transmit the encrypted machine learning model to the second processor according to the trusted processing circuit determined valid.

In some embodiments, the second electronic device further comprises a memory, wherein the second processor is further configured to write the encrypted machine learning model to the memory. The trusted processing circuit further comprises: a memory controller configured to read the encrypted machine learning model from the memory and write the machine learning model got through the decryption to the memory. An access pattern of the memory device writing the machine learning model to the memory is different from an access pattern of the second processor.

In some embodiments, the first processor is further configured to generate a random seed. The trusted processing circuit is further configured to generate a proof according to the random seed and the first public key and a first private key. The second processor is further configured to output the first public key and the proof to the first processor. The first processor is further configured to determine whether the first private key matches the first public key according to the random seed, the first public key and the proof and transmit the first public key to the third processor to perform the check operation according to determining that the first private key matches the first public key.

In some embodiments, the first processor is further configured to store a limit state in the encrypted machine learning model, wherein the trusted processing circuit is further configured to perform the secure computing operation of the inference of the machine learning model according to the limit state.

In some embodiments, the limit state comprises an input data signature state. The second processor is further configured to determine whether a signature matches an input data of the second electronic device. The trusted processing circuit performs the secure computing operation of the inference of the machine learning model according to the signature and the input data matched.

In some embodiments, a system for executing machine learning model inference is provided. The system comprises first to second electronic devices. The first electronic device comprises a first processor configured to encrypt a machine learning model to generate an encrypted machine learning model and generate a random seed. The second electronic device comprises a second processor configured to receive the random seed and a trusted processing circuit configured to generate a proof according to the random seed, a public key embedded in the trusted processing circuit and a private key matching the public key. The first processor is further configured to receive the public key and the proof, and determine whether the trusted processing circuit has the private key according to the random seed, the public key and the proof. The first processor transmits the encrypted machine learning model to the second electronic device according to the determination. The trusted processing circuit is further configured to perform a secure operation of an inference of the machine learning model.

In some embodiments, the first processor is further configured to store an usage time limit state to the encrypted machine model. The usage time limit state comprises a limit time. When a current time is later than the limit time, the trusted processing circuit is further configured to forbid the inference of the machine learning model.

A method for executing machine learning model inference is provided. The method comprises: generating a random seed and transmitting the random seed to a first electronic device; receiving a first public key of the first electronic device and a proof generated according to the random seed of the first electronic device, the first public key and a first private key; verifying the proof according to the random seed and the first public key; when the proof passes the verification, transmitting the first public key to a second electronic device to determine whether the first public key is registered in a database of the second electronic device; when determining that the first public key is registered in the database, encrypting a machine learning model to generate an encrypted machine learning model; and transmitting the encrypted machine learning model to the first electronic device to perform an secure computing operation of the machine learning model.

In some embodiments, the encrypting comprises: storing a usage number limit state in the encrypted machine learning model. The usage number state comprises a number. When a count number of the first electronic device performing the secure computing of the machine learning model is greater than the number, the first electronic device stop performing the secure computing of the machine learning model.

In some embodiments, the method further comprises: storing a blind signature data limit state in the encrypted machine learning model to limit the first electronic device to using blind signed data as input data of the machine learning model; receiving blinded data generated according to data by the first electronic device to blind sign the data; performing a signature operation to the blinded data according to a second private key to generate blinded signature; and outputting the blinded signature and a second public matching the second private key to the first electronic device, wherein the first electronic device unblinds the blinded signature to generate a signature, wherein the first electronic device performs the secure computing operation of the machine learning model according to the signature, the second public key and the data.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts. Well-known implementations or operations are not shown or described in detail to avoid obscuring aspects of various embodiments of the present disclosure.

Unless otherwise specified, terms used in the present disclosure generally have their ordinary meanings that are clearly established in the art or in the specific context in which each term is used. Those of ordinary skill will understand that components or procedures may be referred to by different names.

It should be noted that terms used herein to describe various components or procedures, such as "first" and "second", are intended to distinguish one component or procedure from another. However, elements, procedures and their sequence should not be limited by these terms. For example, a first element could be termed a second element, and a second element could, similarly, be termed a first element, without departing from the scope of the present disclosure.

Figure 1:
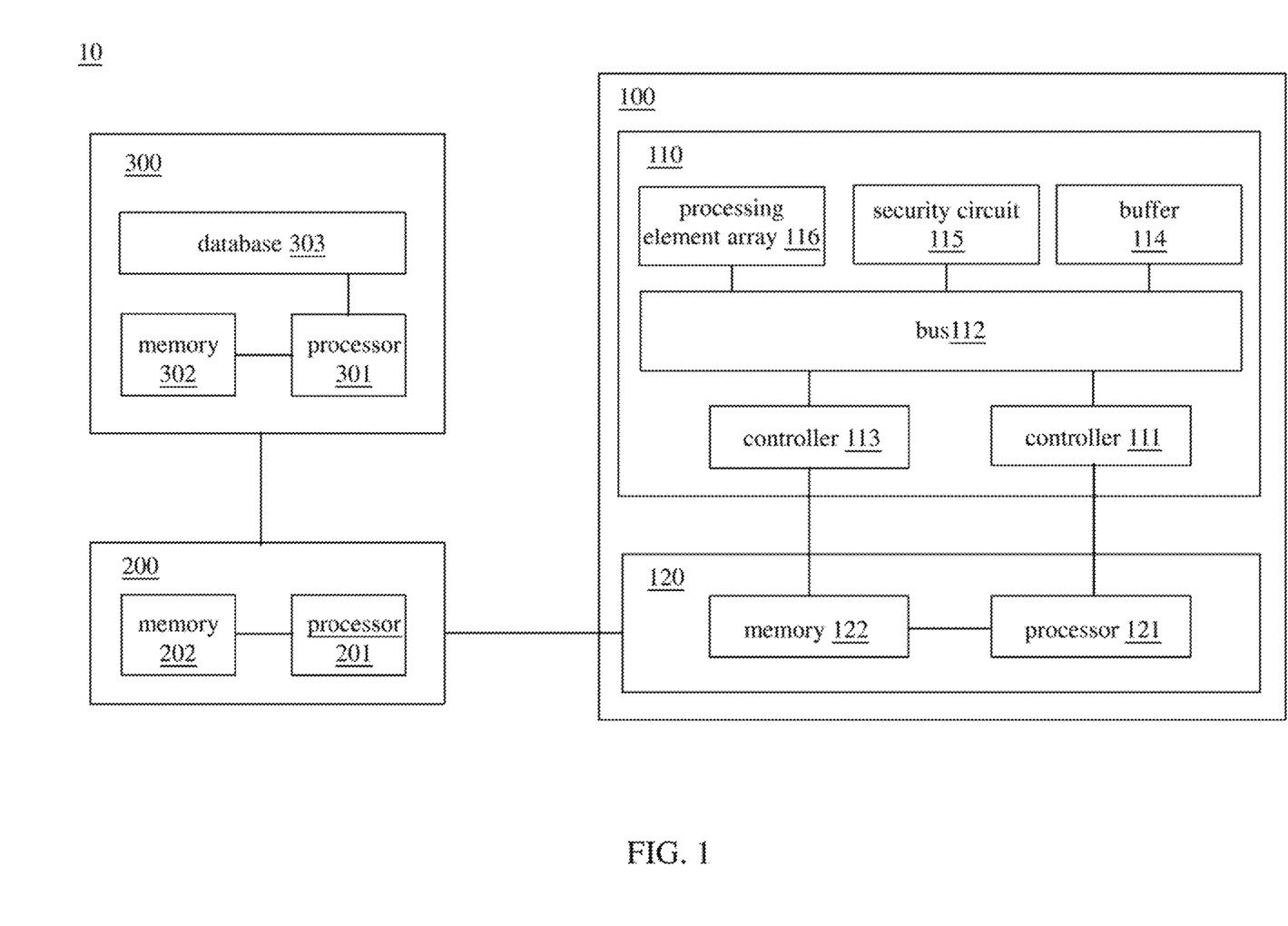
FIG. 1 is a schematic diagram of a system, in accordance with various embodiments of the present disclosure.

Reference is now made to FIG. 1. FIG. 1 is a schematic diagram of a system 10, in accordance with various embodiments of the present disclosure. The system 10 executes confidential (secure) computing of machine learning model to ensure secret of model of a model provider and secret of data of a model user not leaked during the execution of the machine learning model.

For illustration, the system 10 includes an electronic device 100 of the model user, an electronic device 200 of the model provider and an electronic device 300 of a hardware provider. The electronic device 200 stores machine learning model and provides protected or encrypted model to the electronic device 100. The electronic device 100 stores test data and executes an inference of machine model to the test data. The electronic device 300 checks whether the hardware of the electronic device has a verified identification.

As shown in FIG. 1, the electronic device 100 includes a trusted processing circuit 110 and a computer 120. The trusted processing circuit 110 is a processing circuit of trusted execution, for example, a graphics processing unit circuit supporting trusted execution. In some embodiments, the trusted processing circuit 110 is a trusted neural processing unit (TNPU).

According to some embodiments, the trusted neural processing unit is a secure neural network accelerator protecting secrets of user data and model parameters from being leaked in an untrusted environment through hardware. Since the trusted neural processing unit can be customized for neural networks, the secure inference of the trusted neural processing unit is more efficient than some approaches.

In some embodiments, the trusted processing circuit 110 includes a controller 111, a bus 112, a controller 113, a buffer 114, a security circuit 115 and a processing element array 116. In some embodiments, the bus 112 is a system on a chip (SoC) bus. The controller 113 is an oblivious random access memory (ORAM) controller. The buffer 114 is an on-chip buffer. The security circuit 115 includes circuits for security functions.

In some embodiments, the computer 120 and the electronic devices 200-300 are computers like a laptop, a desktop or a mainframe, etc. The computer 120, the electronic devices 200 and 300 include processors 121, 201, 301 respectively. The computer 120, the electronic devices 200 and 300 further include memories 122, 202, 302 respectively. The electronic device 300 further includes a database 303.

According to some embodiments, the processors 121, 201, 301 include central processing unit (CPU), or other programmable general-purpose or special-purpose micro control unit (MCU), microprocessor, digital signal processor (DSP), programmable controller, application-specific integrated circuit (ASIC), graphics processing unit (GPU), arithmetic logic unit (ALU), complex programmable logic device (CPLD), field-programmable gate array (FPGA), or other similar components or a combination of the above components.

The memories 122, 202, 302 include static random access memory (SRAM), dynamic random access memory (DRAM), or other similar components or a combination of the above components.

In the embodiment shown in FIG. 1, the trusted processing circuit 110 is coupled to the computer 120. The computer 120 is coupled to the electronic device 200. The electronic device 200 is coupled to the electronic device 300. It should be understood that in the embodiments and the scope of patent application, the description related to "coupled to" can refer to an element that is indirectly coupled to another element through other elements, or that an element is directly coupled to another element without passing through other elements.

For example, in some embodiments, the trusted processing circuit 110 directly coupled to input/output (I/O) ports of the computer 120. The computer 120 is coupled to the electronic device 200 through the internet. The electronic device 200 is coupled to the electronic device 300 through the internet.

In some embodiments, the bus 112 is coupled to the controllers 111, 113, the buffer 114, the security circuit 115 and the processing element array 116. The controller 111 is coupled to the processor 121. The controller 113 is coupled to the memory 122. The processor 121 is coupled to the memory 122. The processor 201 is coupled to the memory 202. The processor 301 is coupled to the memory 302 and the database 303.

According to some embodiments, when the trusted processing circuit 110 is produced, an identity (ID) and a public key pkt of the trusted processing circuit are registered in the electronic device 300. In some embodiments, the database 303 stores all identities and public keys of all trusted processing circuit produced by the hardware provider, including the ID and the public key pkt of the trusted processing circuit 110. In some embodiments, the database 303 is an immutable database, for example, a block chain database or other database protected by any suitable technologies.

The processor 301 executes search operations to the database 303 and a secure communication between the electronic devices 300 and 200. The secure communication ensures that secrets of data transmitted between two devices will not be leaked. The memory 302 stores data of the electronic device 300.

The processor 201 executes secure communications with the trusted processing circuit 110, the computer 120 and the electronic device 300 separately. The processor 201 encrypts the machine learning model stored in the electronic device 200. The processor 201 executes the identification scheme to the electronic device 100. The processor 201 executes blind signature operation to data form the electronic device 100. The memory 202 stores data of the electronic device 200.

The processor 121 executes the secure communications with the electronic device 200 and the trusted processing circuit 110. The processor 201 transmits data to the trusted processing circuit 110 to execute secure computing of the encrypted machine learning model. The processor 201 requests the electronic device 200 to execute the blind signature.

In some embodiments, the controller 111 receives commands from the processor 121. In some embodiments, the controller 111 and the security circuit 115 cooperatively executes the secure communications with the electronic device 200 and the computer 120.

The bus 112 transmits data and signals between the controller 111, the controller 113, the buffer 114, the security circuit 115 and the processing element array 116.

The controller 113 performs read operation and write operation to the memory 122. The controller 113 protects the data transfer between the trusted processing circuit 110 and the memory 122, ensuring that the computer 120 cannot retrieve the secrets in the data written to the memory 122 by the controller 113. Specifically, in some embodiments, the controller 113 utilizes an access pattern different from the access pattern of the processor 121 to protect the secrets in the data written to the memory 122 by the controller 113.

The buffer 114 temporarily storing data for the internal computation of the trusted processing circuit 110.

In some embodiments, the trusted processing circuit 110 stores its ID, public key pkt and private key skt. The devices or circuits (e.g., the computer 120) outside the trusted processing circuit 110 cannot access the private key skt. Therefore, the model user is not able to get the private key skt. In some embodiments, one or more of the ID, the public key and the private key of the trusted processing circuit 110 are embedded in the security circuit 115. For example, in some embodiments, one or more of the ID, the public key pkt and the private key skt of the trusted processing circuit 110 are codes corresponding to physical unclonable function (PUF) of the security circuit 115. For example, the security circuit 115 includes an one-time-programmable (OTP) memory storing one or more of the ID, the public key pkt and the private key skt of the trusted processing circuit 110.

The processing element array 116 executes an inference acceleration of machine learning model.

The configurations of FIG. 1 are given for illustrative purposes. Various implements are within the contemplated scope of the present disclosure. For example, in some embodiments, the coupling depicted in FIG. 1 can be replaced by communications like wireless communication or optical communication. For example, the electronic device 100 is connected to the electronic device 200 through wireless communication. The electronic device 200 is connected to the electronic device 300 through wireless communication.

Figure 2:
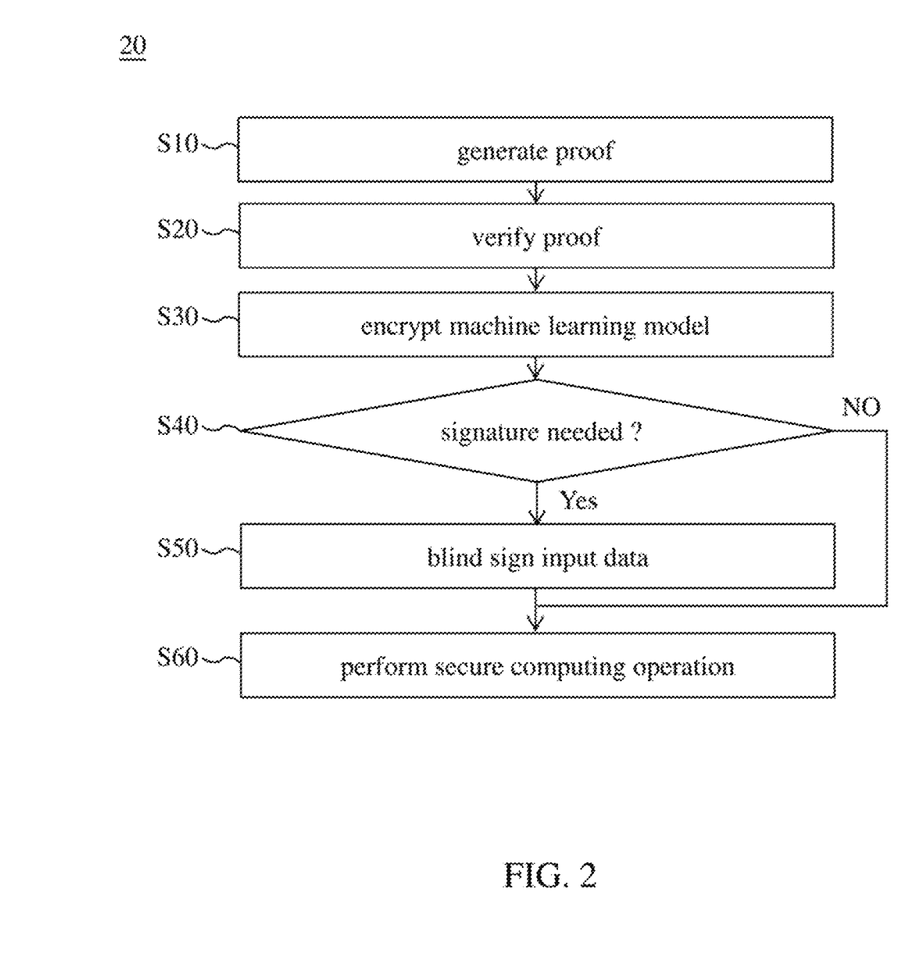
FIG. 2 is a flowchart diagram of a method for operating the system corresponding to FIG. 1, in accordance with various embodiments of the present disclosure.
Figure 3:
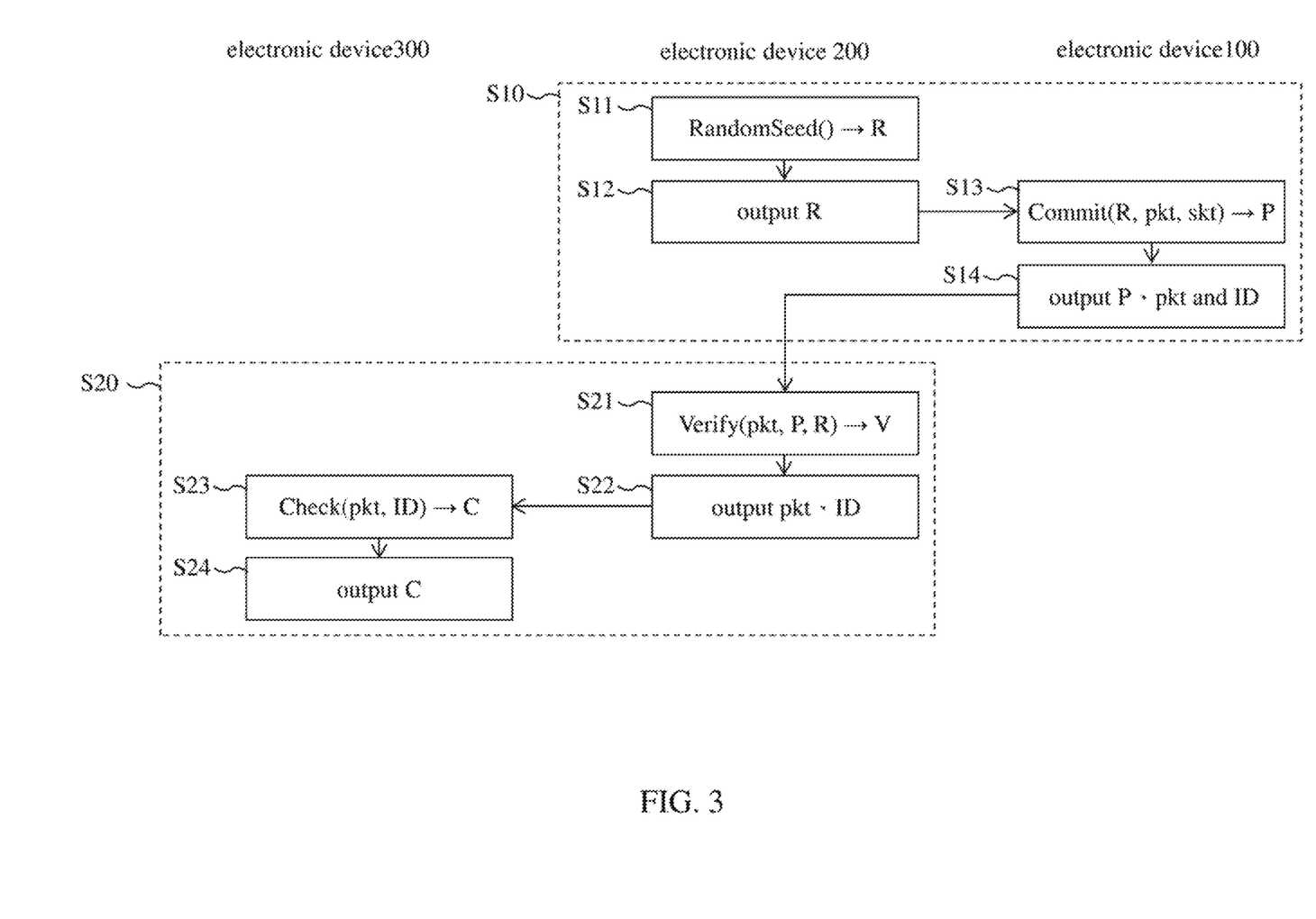
FIGS. 3-4 are flowchart diagrams of some steps corresponding to method of FIG. 2, in accordance with various embodiments of the present disclosure.
Figure 4:
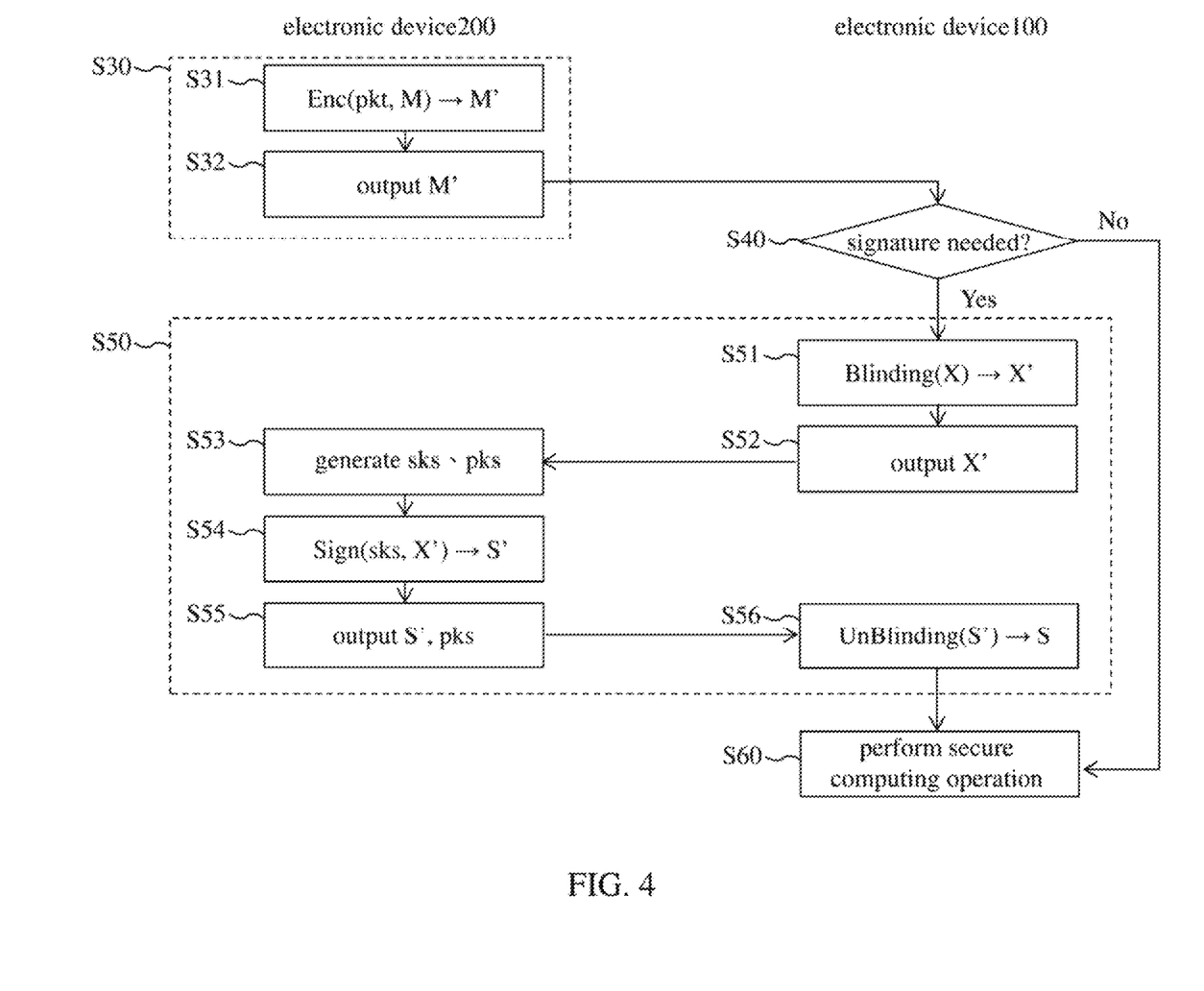

Reference is now made to FIG. 2 to FIG. 4. FIG. 2 is a flowchart diagram of a method 20 for operating the system 10 corresponding to FIG. 1, in accordance with various embodiments of the present disclosure. FIGS. 3-4 are flowchart diagrams of some steps corresponding to method 20 of FIG. 2, in accordance with various embodiments of the present disclosure.

As shown in FIG. 2, the method 20 includes steps S10-S60. In some embodiments, as shown in FIG. 3, the step S10 includes steps S11 to S14. The step S20 includes steps S21 to S24. In some embodiments, as shown in FIG. 4, the step S30 includes steps S31 to S32. The step S50 includes steps S51 to S56.

In some embodiments, the system 10 executes secure machine learning model inference. The system 10 protects the security of data transfer and machine learning model inference through the identification scheme, encrypting the machine learning model, blind signature to input data, secure communication and secure execution.

Reference is now further made to FIG. 1 to FIG. 3. The steps S10-S20 are for identification scheme of the trusted processing circuit 110. In the step S10, the system 10 generates a proof of the identification of the trusted processing circuit 110. In the step S20, the system 10 verifies the proof of the identification of the trusted processing circuit 110.

As shown in FIG. 3, in the step S11, the processor 201 performs a random seed generating operation Random-Seed() to generate a random seed R.

In the step S12, the processor 201 executes the secure communication with the trusted processing circuit 110 to output the random seed R to the trusted processing circuit 110. In some embodiments, the processor 201 outputs the random seed R to the computer 120 and the computer 120 outputs the random seed to the trusted processing circuit 110.

In the step S13, the electronic device 100 generates a proof P for proving that the electronic device 100 having a valid trusted processing circuit 110. In some embodiments, the trusted processing circuit 110 performs the commit operation Commit(R, pkt, skt) of the identification scheme according to the random seed R, the public key pkt and private key skt to generate the proof P. In some embodiments, the controller 111 receives commands from the processor 121 to request the security circuit 115 to perform the commit operation.

In the step S14, the trusted processing circuit 110 executes the secure communication to output the proof P, the public key pkt and the ID to the computer 120. The computer 120 outputs the proof, the public key pkt and the ID to the electronic device 200.

In the step 21, the processor 201 performs a verify operation Verify(pkt, P, R) of the identification scheme to generate a verification result V according to the public key pkt, the proof P and the random seed R. The processor 201 determines whether the trusted processing circuit 110 has the private key skt matching the public key pkt according to the verification result V. For example, when the verification result V has a first value (e.g., True), the processor 201 determines that the trusted processing circuit 110 has the private key skt corresponding to the public key pkt. On the contrary, when the verification result V has a second value different from the first value (e.g., False), the processor 201 determines that the trusted processing circuit 110 does not have the private key skt corresponding to the public key pkt.

In the step S22, the processor 201 executes the secure communication to output the public key and the ID to the electronic device 300. In some embodiments, when the processor 201 determines that the trusted processing circuit 110 has the private key skt corresponding to the public key pkt, the processor 201 outputs the public key pkt and the ID to the electronic device 300. When the processor 201 determines that the trusted processing circuit 110 do not have the private key skt corresponding to the public ley pkt, the processor 201 does not output the public key pkt and the ID to the electronic device 300.

In the step S23, the processor 301 performs a check operation Check (pkt, ID) to generate a check result according to the public key pkt and the ID. In the check operation Check (pkt, ID), the processor 301 checks whether the public key pkt and the ID from the processor 201 is registered (i.e., recorded in the same piece of register data in the database 303). The public key pkt and the ID being registered indicates that a trusted processing circuit having the public key pkt and the ID has been produced. When the processor 301 determines that the public key pkt and the ID are registered, the processor 301 generates the check result C having the first value (e.g., True). When the processor 301 determines that the public key pkt and the ID are not registered, the processor 301 generates the check result C with the second value (e.g., False) different from the first value.

In the step S24, the processor 301 executes the secure communication to output the check result C to the electronic device 200. In some embodiments, the processor 201 determines whether the public key pkt and the ID are registered according to the check result C. When the check result C has the first value (e.g., True), the processor 201 determines that the public key pkt and the ID are registered. On the contrary, when the check result C has the second value (e.g., False) different from the first value, the processor 201 determines that the public key pkt and the ID are not registered.

In some embodiments, the processor 201 determines whether the electronic device 100 pass a verification (i.e., whether having a valid trusted processing circuit 110) according to the verification result V and the check result C. When the verification result V and the check result C have the first value (e.g., True), the processor 201 determines that the electronic device 100 pass the verification. When the verification result V and/or the check result C have the second value (e.g., False), the processor 201 determines that the electronic device 100 pass the verification. In some embodiments, the electronic device 100 passing the verification indicates that only the trusted processing circuit 110 has the private key skt corresponding to the public key pkt.

Reference is now made to FIG. 1 to FIG. 4. In the step S30, the system 10 encrypts the machine learning model. In some embodiments, when the electronic device 100 is determined passing the verification in the step S20, the system 10 performs the step S30. On the contrary, when the electronic device 100 is determined not passing the verification in the step S20, the system 10 does not perform the step S30.

In the step S31, the processor 201 performs the encrypt operation Enc(pkt, M) according to the public key pkt to encrypt the machine learning model M stored in the electronic device 200 to generate the encrypted machine learning model M'.

In some embodiments, the model provider determines a limit for using the machine learning model M. During the encrypt operation, the processor 201 stores a limit state indicating the limit for using the machine model M in the encrypted machine learning model M'.

In some embodiment, the model provider determines whether the input data (the test data) need signature (need to be signed) to limit the input data for the model user to execute the inference. When the model provider determines that the input data (test data) needs signature, in the step S31, the processor 201 stores the limit state including a state "s" in the encrypted machine learning model M'. The state "s" indicates that the input data (test data) need signature.

In some embodiments, the model provider determines a limit usage number of the machine learning model M to limit the number of inferences executed by the model user. When the model provider determines that the machine learning model M has the limit number of use, in the step S31, the processor 201 stores the limit state including a state "c" in the encrypted machine learning model M'. The state "c" indicates that the machine learning model M has the limit of use. In some embodiments, the state "c" includes a limit usage number N of the machine leaning model M.

In some embodiments, the model provider determines a limit time of the machine learning model M to limit the time for the model user to execute the inference. When the model provider determines that the machine learning model M has the limit time, the processor 201 stores the limit state including the state "t" in the encrypted machine learning model M', the state "t" indicates that the machine learning model M has a limit time for use. In some embodiments, the state "t" includes a limit time T for using the machine learning model M. In some embodiments, the limit time T is a deadline of using the machine learning model M.

In some embodiments, when the model provider determines that the machine learning model M does not have a limit, in the step S31, the processor 201 stores the limit state including a state "n" in the encrypted machine learning model M'. The state "n" indicates that there is no limit for using the machine learning model M.

In the step S32, the processor 201 executes the secure communication with the trusted processing circuit 110 to output the encrypted machine learning model M' to the trusted processing circuit 110. In some embodiments, the processor 121 receives the encrypted machine learning model M' and outputs the encrypted machine learning model M' to the controller 111.

In step S40, the system 10 determines whether the input data (test data) of the machine learning model M need signature. In some embodiments, the system 10 performs the step S50 according to the processor 121 determining that the limit state includes the state "s" (the machine learning model only receives signed input data). On the contrary, when the processor 121 determines that the limit state does not include the state "s", the system 10 does not execute the step S50.

In step S50, the system 10 perform the blind signature to the input data (test data) X stored in the electronic device 100 to generate the signed test data for the machine learning model M. The input data X is the test data of the model user for inference of the machine learning model M.

In the step S51, the processor 121 performs the blinding operation Blinding(X) of the blind signature to the input data X to generate blinded data X'.

In the step S52, the processor 121 executes the secure communication with the electronic device 200 to output the blinded data X' to the electronic device 200.

In the step S53, the processor 201 performs a key generation operation GenSignKey of the blind signature to generate a private key sks and a public key pks. The system 10 performs the blind signature according to the private key sks and the public key pks.

In the step S54, the processor 201 performs the sign operation Sign(sks, X') to the blinded data X' to generate a blinded signature S' according to the private key sks.

In the step S55, the processor 201 performs the secure communication with the computer 120 to output the blinded signature S' to the computer 120.

In some embodiments, the processor 201 further performs the secure communication with the trusted processing circuit 110 to output the public keys pks to the trusted processing circuit 110.

In the step S56, the processor 121 performs an unblinding operation UnBlinding(S') of the blind signature to the blinded signature S' to generate a signature S.

As shown in FIG. 4, when the system 10 determines that the input data need signature in the step S40, the system 10 performs the step S50 and then performs the step S60. On the contrary, when the system 10 determines that the input data does not need signature in the step S40, the system 10 directly performs the step S60.

In the step S60, the system 10 performs the secure execution of the inference of the machine learning model M. In some embodiments, the controller 113 performs oblivious read operation and oblivious write operation (e.g., using a memory addressing scheme different from the memory addressing scheme of the processor 121) to implement the secure execution of the inference.

In some embodiment, the processor 121 stores the encrypted machine learning model M' to the memory 122 in the step S60.

The security circuit 115 decrypts the encrypted machine learning model M' to the machine learning model M according to command from the controller 111. The controller 113 stores the machine learning model M to the memory 122. In some embodiments, the controller 113 performs the oblivious write operation to store the machine learning model M to the memory 122.

In some embodiments, the processor 121 stores the input data X into the memory 122. The input data X is used as input data of the inference of the machine learning M executed by the controller 111.

The controller 111 decrypts the encrypted machine learning model M' to get the limit state of the machine learning model M. The controller 111 determines the state included in the limit state of the machine learning model M.

When the controller 111 determines that the limit state of the machine learning model M includes the state "s" (i.e., the input data needs signature), the processor 121 stores the signature S and the public key pks in the memory 122.

Then, the controller 111 performs the verify operation Verify(pks, X, S) of the blind signature to determine whether the signature S is correct (determine whether the input data X matches the signature S) according to the public key pks and the input data X. In some embodiments, the controller 111 performs the verify operation Verify(pks, X, S) according to the public key pks, the input data X and the signature S to generate the verification result. When the verification result has the first value (e.g., True), the controller 111 determines that the signature S is correct. On the contrary, when the verification result has a second value (e.g., False) different from the first value, the controller determines that the signature S is incorrect.

When the controller 111 determines that the signature S is correct, the controller 111 perform an inference operation Model(M, X) of the machine learning model M to the input data X to generate prediction data Y.

When the controller 111 determines that the limit state of the machine learning model M includes the state "c" (i.e., machine learning model M having the limit usage number), the controller 111 stores a count number in the buffer 114. In some embodiments, an initial value of the count number is zero of one. Every time the controller 111 performs the inference operation Model(M, X), the controller 111 adds a value one to the count number. When the count number is greater than the limit usage number, the controller 111 forbids (does not perform) the inference operation Model (M, X).

When the controller 111 determines that the limit state of the machine learning model M includes the state "t" (indicating a limit time for using the machine learning model M), the controller 111 determines whether the current time is within the limit time T before performing the inference operation Model(M, X). After the controller 111 determines that the current time is earlier than or equal to the limit time T, the controller 111 performs the inference operation Model (M, X). When the controller 111 determines that the current time is later than the limit time T, the controller forbids the inference operation Model(M, X).

When the controller 111 determines that the limit state of the machine learning model M includes the state "n" (indicating that the machine learning model M has no limits), the controller 111 performs the inference operation Model(M,X) directly.

According to some embodiments, in the inference operation Model(M, X), the controller 111 requests the controller 113 to read the first layer (e.g., the weights of the first layer) of the machine learning model M from the memory 122. The processing element array 116 infers to generate features of the first layer according to the input data X and the first layer of the machine learning model M. The controller 111 determines the size (bits) of the features of the first layer. The controller 111 determines whether to store the features of the first layer to the buffer 114 or the memory 122 according to the size of the features of the first layer. When the size of the features of the first layer is smaller than a threshold, the features of the first layer are stored in the buffer 114. On the contrary, when the size of the features of the first layer is greater than the threshold, the features of the first layer are stored in the memory 122.

Then, the controller 111 requests the controller 113 to read the second layer of the machine learning model M form the memory 122. The processing element array 116 infers to generate features of the second layer according to the features of the first layer and the second layer of the machine learning model M. Similar to operations described in the previous paragraph, the controller 111 determines the size of the features of the second layer and determines whether to store the features of the second layer to the buffer 114 or the memory 122.

The controller 111 repeats operations similar to what is described in the previous paragraphs to the remaining layers of the machine learning model M to generate features of each layer and the prediction data Y.

The controller 111 requests the controller 113 to store the prediction data Y to the memory 122 without encrypting the prediction data Y. For example, the controller 113 does not store the prediction data with an oblivious write operation. When the controller 111 finishes the inference operation Model(M, X), the controller 111 generates an end signal to the processor 121. The end signal indicates that the inference operation Model(M, X) ends.

It should be understood that, for steps in the method 20, the sequence in which these steps is performed, unless explicitly stated otherwise, can be altered depending on actual needs; in certain cases, all or some of these steps can be performed concurrently. Additional operations can be provided before, during, and after the steps shown by FIG. 2 to FIG. 4, and some of the steps described below can be replaced or eliminated, for additional embodiments of the method 20.

In view of the above, a system and a method for executing machine learning model inference are provided. The provided system encrypts the machine learning model of the model provider to protect secrets of the model. In addition, the system executes the identification scheme to the trusted processing circuit of the model user to ensure that only the trusted processing circuit is able to decrypt the encrypted machine learning model. The provided system further supports secure communication and secure computing to ensure that the secrets of the model will not be leaked.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. A system for executing machine learning model inference, comprising:
   a first electronic device comprising:
      a first processor configured to encrypt a machine learning model to generate an encrypted machine learning model;
   a second electronic device comprising:
      a second processor configured to receive the encrypted machine learning model; and
      a trusted processing circuit configured to decrypt the encrypted machine learning model to get the machine learning model, and perform a secure computing operation of an inference of the machine learning model; and
   a third electronic device comprising:
      a database configured to store a plurality of public keys; and
      a third processor configured to perform a check operation to check whether a first public key of the trusted processing circuit is in the plurality of public keys of the database to determine whether the trusted processing circuit is valid,
      wherein the first processor is further configured to transmit the encrypted machine learning model to the second processor according to the trusted processing circuit determined valid.

2. The system of claim 1, wherein the second electronic device further comprises a memory, wherein the second processor is further configured to write the encrypted machine learning model to the memory,
   wherein the trusted processing circuit further comprises:
      a memory controller configured to read the encrypted machine learning model from the memory and write the machine learning model got through the decryption to the memory, wherein an access pattern of the memory controller writing the machine learning model to the memory is different from an access pattern of the second processor.

3. The system of claim 1, wherein the first processor is further configured to generate a random seed;
   wherein the trusted processing circuit is further configured to generate a proof according to the random seed and the first public key and a first private key;
   wherein the second processor is further configured to output the first public key and the proof to the first processor; and
   wherein the first processor is further configured to determine whether the first private key matches the first public key according to the random seed, the first public key and the proof and transmit the first public key to the third processor to perform the check operation according to determining that the first private key matches the first public key.

4. The system of claim 1, wherein the first processor is further configured to store a limit state in the encrypted machine learning model, wherein the trusted processing circuit is further configured to perform the secure computing operation of the inference of the machine learning model according to the limit state.

5. The system of claim 4, wherein the limit state comprises an input data signature state;
   wherein the second processor is further configured to determine whether a signature matches an input data of the second electronic device; and
   wherein the trusted processing circuit performs the secure computing operation of the inference of the machine learning model according to the signature and the input data matched.

6. A system for executing machine learning model inference, comprising:
   a first electronic device comprising:
      a first processor configured to encrypt a machine learning model to generate an encrypted machine learning model and generate a random seed; and
   a second electronic device comprising:
      a second processor configured to receive the random seed; and
      a trusted processing circuit configured to generate a proof according to the random seed, a public key embedded in the trusted processing circuit and a private key matching the public key, wherein the first processor is further configured to receive the public key and the proof, and determine whether the trusted processing circuit has the private key according to the random seed, the public key and the proof, wherein the first processor transmits the encrypted machine learning model to the second electronic device according to the determination, wherein the trusted processing circuit is further configured to perform a secure operation of an inference of the machine learning model.

7. The system of claim 6, wherein the first processor is further configured to store an usage time limit state to the encrypted machine learning model;

wherein the usage time limit state comprises a limit time; and when a current time is later than the limit time, the trusted processing circuit is further configured to forbid the inference of the machine learning model.

8. A method for executing machine learning model inference, comprising:

generating a random seed and transmitting the random seed to a first electronic device;

receiving a first public key of the first electronic device and a proof generated according to the random seed of the first electronic device, the first public key and a first private key;

verifying the proof according to the random seed and the first public key;

when the proof passes the verification, transmitting the first public key to a second electronic device to determine whether the first public key is registered in a database of the second electronic device;

when determining that the first public key is registered in the database, encrypting a machine learning model to generate an encrypted machine learning model; and transmitting the encrypted machine learning model to the first electronic device to perform an secure computing operation of the machine learning model.

9. The method of claim 8, wherein the encrypting comprises:

storing a usage number limit state in the encrypted machine learning model, wherein the usage number state comprises a number, wherein when a count number of the first electronic device performing the secure computing of the machine learning model is greater than the number, the first electronic device stop performing the secure computing of the machine learning model.

10. The method of claim 8, further comprising:

storing a blind signature data limit state in the encrypted machine learning model to limit the first electronic device to using blind signed data as input data of the machine learning model;

receiving blinded data generated according to data by the first electronic device to blind sign the data;

performing a signature operation to the blinded data according to a second private key to generate blinded signature; and outputting the blinded signature and a second public key matching the second private key to the first electronic device, wherein the first electronic device unblinds the blinded signature to generate a signature, wherein the first electronic device performs the secure computing operation of the machine learning model according to the signature, the second public key and the data.

* * * * *